(12) United States Patent
Vreeland

(10) Patent No.: US 8,679,329 B2
(45) Date of Patent: Mar. 25, 2014

(54) FILTER SYSTEM FOR POSITIONING WITHIN A STORM WATER SEWER

(76) Inventor: Gregory M. Vreeland, Springboro, OH (US)

( * ) Notice: Subject to any disclaimer, the term of this patent is extended or adjusted under 35 U.S.C. 154(b) by 322 days.

(21) Appl. No.: 13/135,914

(22) Filed: Jul. 18, 2011

(65) Prior Publication Data

US 2013/0020242 A1    Jan. 24, 2013

(51) Int. Cl.
*E03F 5/04* (2006.01)
*B01D 29/27* (2006.01)

(52) U.S. Cl.
CPC .............. *E03F 5/0404* (2013.01); *B01D 23/04* (2013.01); *B01D 2201/0423* (2013.01); *B01D 2221/12* (2013.01)
USPC ...... 210/164; 210/170.03; 210/337; 210/474; 210/485; 404/4

(58) Field of Classification Search
CPC .......... E03F 5/0404; E03F 5/06; B01D 23/04; B01D 2201/0423; B01D 2221/12
USPC ............ 210/163, 164, 170.03, 335, 337, 474, 210/484, 485; 404/2, 4, 5
See application file for complete search history.

(56) References Cited

U.S. PATENT DOCUMENTS

| | | | |
|---|---|---|---|
| 1,310,055 A | | 7/1919 | Caldwell |
| 4,419,232 A | * | 12/1983 | Arntyr et al. ................... 210/164 |
| 5,284,580 A | | 2/1994 | Shyh |
| 5,575,925 A | | 11/1996 | Logue, Jr. |
| 5,985,157 A | * | 11/1999 | Leckner et al. ............... 210/163 |
| 6,086,758 A | * | 7/2000 | Schilling et al. .............. 210/164 |
| 6,149,803 A | | 11/2000 | DiLoreto, Jr. et al. |
| 6,537,446 B1 | * | 3/2003 | Sanguinetti ................... 210/163 |
| 6,551,023 B2 | * | 4/2003 | Allard ............................ 210/164 |
| 6,666,974 B2 | | 12/2003 | Page |
| 6,998,039 B2 | | 2/2006 | Harris et al. |
| 7,094,338 B2 | | 8/2006 | Morris et al. |
| 7,112,274 B1 | | 9/2006 | Sanguinetti |
| 7,201,843 B2 | * | 4/2007 | Sasaki et al. .................. 210/164 |
| D598,196 S | | 8/2009 | Vreeland |
| D600,324 S | | 9/2009 | Vreeland |
| 7,588,689 B2 | * | 9/2009 | Paoluccio et al. ............. 210/660 |
| D604,800 S | | 11/2009 | Vreeland |
| 7,771,591 B2 | * | 8/2010 | Lucas ........................... 210/163 |
| 2008/0251470 A1 | * | 10/2008 | Kent ........................ 210/170.03 |
| 2008/0290042 A1 | * | 11/2008 | Hanson et al. .................... 404/5 |
| 2011/0278237 A1 | * | 11/2011 | McInnis ........................ 210/163 |
| 2012/0222995 A1 | * | 9/2012 | Sasaki et al. .................. 210/163 |

* cited by examiner

*Primary Examiner* — Christopher Upton
(74) *Attorney, Agent, or Firm* — Jacox, Meckstroth & Jenkins

(57) ABSTRACT

A filter system for a storm water sewer includes a flat mount frame with inwardly projecting support wires and seats on an internal ledge of a grate frame supporting a removable grate. A fabricated circular wire basket has welded cross wires defining openings in side and bottom walls and is lined with a porous filter fabric for collecting silt within storm water flowing through openings in the grate. The wire basket has upwardly projecting bent wire portions hooked onto the support wires of the mount frame and define overflow passages and handle openings for removing the mount frame and the basket after the grate is removed. A smaller and lined lift-out wire basket is supported within a lower portion of the wire basket attached to the mount frame, and each wire basket may be compressed laterally into an oval configuration for use with a rectangular mount frame.

9 Claims, 5 Drawing Sheets

FILTER SYSTEM FOR POSITIONING WITHIN A STORM WATER SEWER

BACKGROUND OF THE INVENTION

The present invention relates to filter systems for use within a storm water sewer for filtering sediment, stones and other foreign materials in order to limit the flow of such materials into the storm water sewer system. There have been many different forms of filter systems either constructed or proposed and which are positioned under the cast metal grate positioned on a grate frame at the top of the storm sewer inlet, for example, as disclosed in U.S. Pat. Nos. 1,310,055, 5,284,580, 5,575,925, 6,149,803, 6,666,974, 6,998,039, 7,094,338, 7,112,274 and Published PCT Application No. PCT/SE98/00409. It is desirable with any such filter system to be light weight and durable in construction, easy to install after the grate is removed from the supporting grate frame, convenient to remove collected sediment and other foreign materials, easy to remove the sediment from the filter media, relatively inexpensive in construction and be able to accommodate the many hundreds of different sizes and configurations of storm sewer inlets and their associated cast metal grates and supporting cast metal grate frames. While some of the filter systems disclosed in the above patents provide some of these features and advantages, none of the filter systems provide all of these features and advantages. Also, applicant has produced one-piece welded wire baskets lined with flexible fabric filter material as disclosed in applicant's U.S. Design Pat. No. 598,196, Pat. No. 600,324 and Pat. No. 604,800. However, these filter baskets were constructed for use under storm water sewer grates and supporting grate frames of specific size and configuration and do not provide all of the desirable features and advantages mentioned above.

SUMMARY OF THE INVENTION

The present invention is directed to an improved filter system for use under a removable metal grate supported by a metal grate frame installed at an inlet of a storm water sewer and which provides all of the desirable features and advantages mentioned above. In general, a filter system constructed in accordance with the invention includes a horizontal and thin mount frame supported by an inwardly projecting ledge of the grate frame, and a welded outer wire basket is suspended from the mount frame. The outer wire basket is constructed of crossing wires welded together to form a bottom wall and a tapering side wall, and a porous flexible filter material lines the outer wire basket and covers the openings between the crossing wires of the basket. The outer wire basket includes upwardly projecting wires which hook onto a separate mount frame, and an upper peripheral portion of the filter material is attached to an upper peripheral portion of the wire basket for receiving storm water and sediment flowing through the openings in the grate. The filter system may also include a smaller lift-out inner wire basket supported within a lower portion of the outer wire basket and having crossing welded wires and lined with the porous flexible filter material. The inner wire basket has handle members for lifting the inner wire basket from the outer wire basket and through the grate frame after the grate is removed to provide for conveniently dumping sediment and materials collected within the inner wire basket and provide for reusing the inner wire basket lined with the filter material. A circular outer wire filter basket and the smaller circular inner wire filter basket may be used with a square mount frame or may be laterally compressed to accommodate various shapes and sizes of rectangular mount frames. The outer wire basket has upwardly projecting wires which are bent and hooked upon inner wire support members of the mount frame.

Other features and advantages of the invention will be apparent from the following description, the accompanying drawings and the appended claims.

DESCRIPTION OF THE ILLUSTRATED EMBODIMENTS

Figure 1:
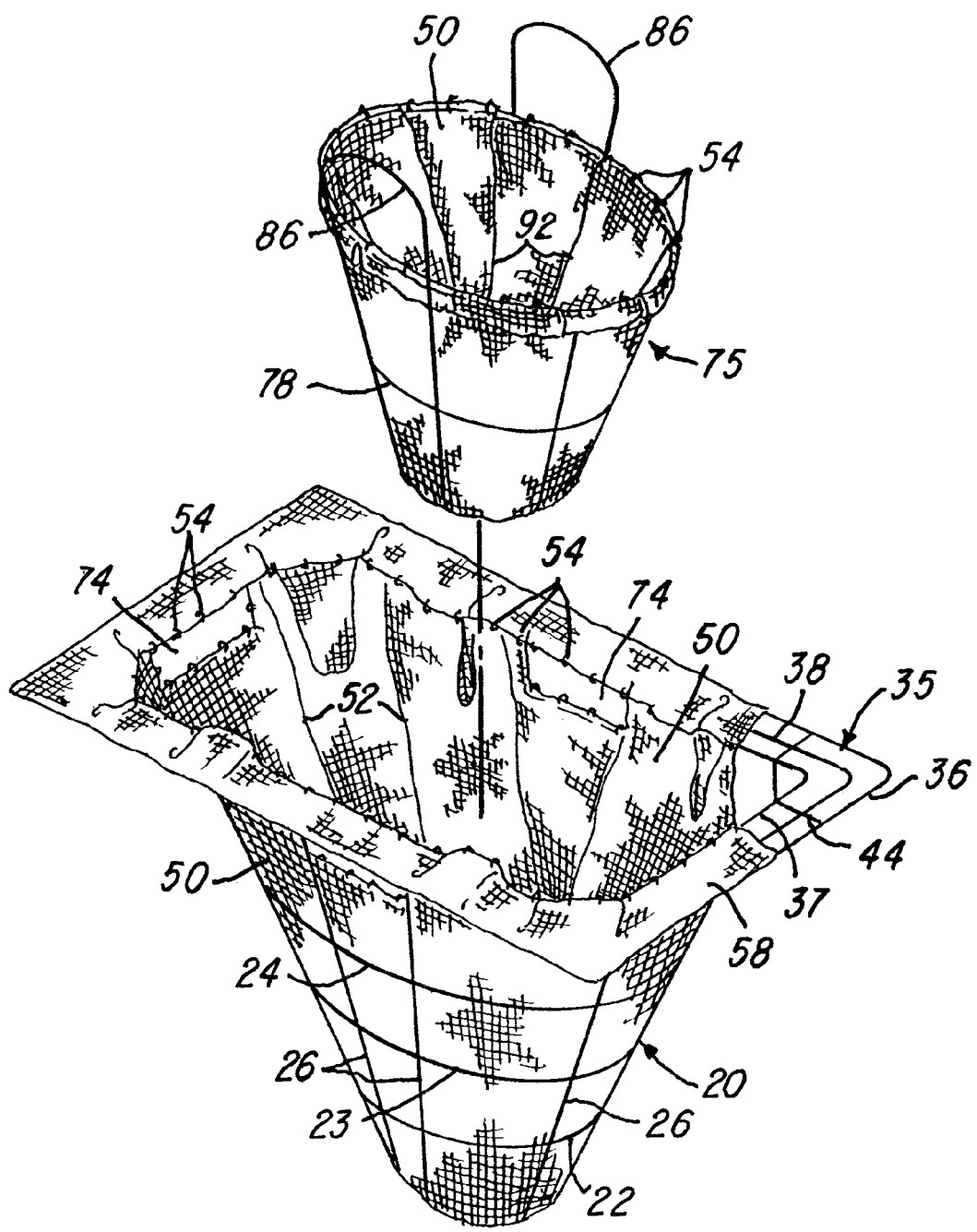
FIG. 1 is a perspective view of a wire mount frame and an outer wire basket lined with a flexible porous filter material, with an inner wire lift-out dump basket exploded from the outer wire basket.
Figure 3:
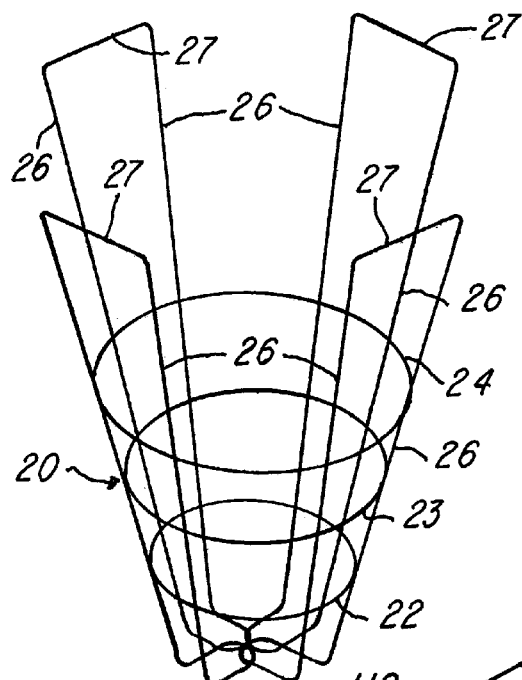
FIG. 3 is a perspective view of an outer wire basket shown in FIGS. 1 & 2 and constructed in accordance with the invention.

FIG. 1 illustrates an outer wire basket 20 which is constructed as shown in FIG. 3 and includes a series of vertically spaced circular steel or metal wires 22, 23 and 24 each of which has opposing welded end surfaces. The circular metal wires 22-24 are welded to a set of four upwardly projecting and inclined continuous steel or metal wires 26 each of which has an upper inverted U-shaped end portion 27 and a lower U-shaped end portion 29, with the end portions 29 overlapping and welded together. The wire basket 20 is connected to a separate wire mount frame 35 (FIG. 5) which includes a rectangular outer frame wire 36, an inner frame wire 37 and an intermediate frame wire 38. The wires 36-38 are coplanar and concentric and are rigidly connected or welded to U-shaped cross wires 42 and cross corner wires 44 which provide the mount frame 35 with a flat, thin and rigid construction.

Figure 5:
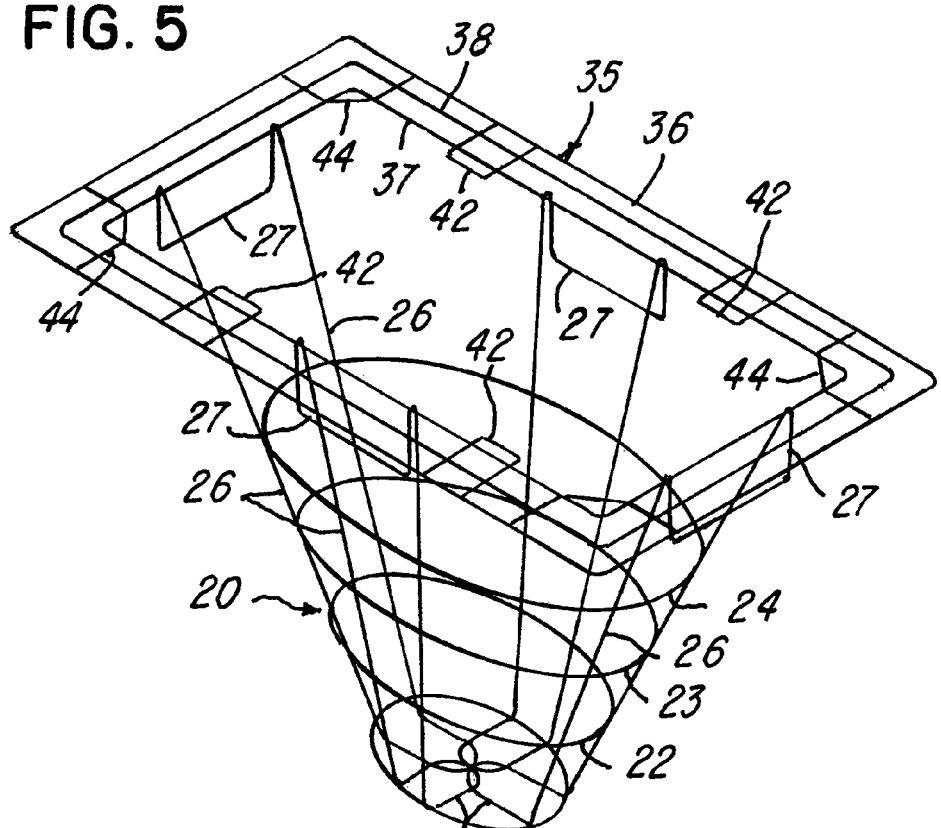
FIGS. 5 & 6 are perspective views of rectangular wire mount frames which support laterally compressed oval wire baskets made from the wire basket as shown in FIG. 3.

As also shown in FIG. 5, the wire basket 20 is connected to the separate mount frame 35 by bending the end portions 27 of the continuous wires 26 downwardly and hooking the end portions onto the inner frame wire 37 of the mount frame 35. In this manner, the wire basket 20 is connected or assembled to the wire mount frame 35 so that the basket 20 is suspended from the mount frame 35. As further shown in FIG. 5, the mount frame 35 is rectangular and the wire basket 20 is compressed laterally or horizontally so that the circular wires 22-24 become oblong or oval in horizontal configuration. The wire basket 20 is lined with a porous flexible filter material 50 (FIGS. 1 & 2) such as a geotextile fabric. A flat sheet of the material 50 is inserted into the wire basket 20, and overlapping pleats 52 and are formed, an upper peripheral portion of the sheet is attached to the inner frame wire 37 by peripherally spaced wire C-shape clamp rings or clips 54. The fabric material 50 has an outwardly projecting flange portion 58 which overlaps the wire mount frame 35.

Figure 2:
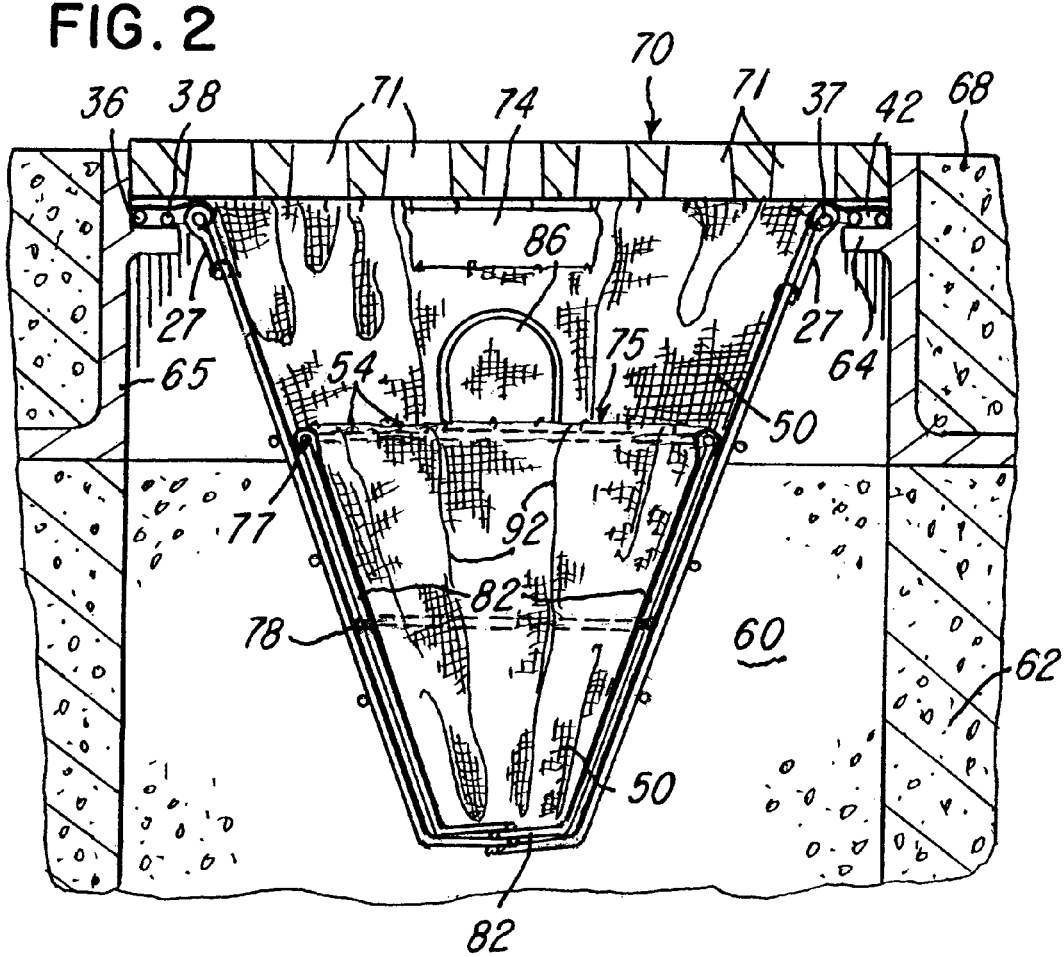
FIG. 2 is a vertical section of the mount frame and the outer wire basket of FIG. 1 installed under a grate supported by an inner ledge of a surrounding grate frame, and with the outer basket supporting the smaller lift-out inner wire dump basket shown in FIG. 1.

Referring to FIG. 2, after the assembly of the lined wire basket 20 and wire mount frame 35 are installed within a passage 60 of a storm sewer 62, the frame wires 36 and 38 of the wire mount frame 35 seat on an inwardly projecting rib or ledge 64 of a grate support frame 65 surrounded by pavement 68 which is usually concrete or asphalt. A cast iron grate 70 with grate slots or openings 71 fits within the grate frame 65 and seats on the frame wires 36 and 38 and cross wires 42 and 44 of the wire mount frame 35. Since the concentric and coplanar frame wires 36-38 and the connecting cross wires 42 and 44 may be of relatively small diameter, the grate 70 is only elevated by a small amount, as shown in FIG. 2, so that the top surface of the grate 70 is only slightly above the top surface of the grate frame 65. As shown in FIGS. 1 and 2, the filter material 50 does not close off the space within the folded over end portions 27 of the basket wires 26 so that overflow openings 74 are formed within an upper portion of the wire basket 20 within the end portions 27. The filter material 50 is attached to the folded over U-shaped end portions 27 of the basket wires 26 by wire clamp rings or clips 54.

As also shown in FIG. 2, a smaller lift-out wire basket 75 (FIG. 1) is supported within a lower portion of the basket 20 and is constructed similarly to the wire basket disclosed in above-mentioned Design Pat. No. 598,196 except that the basket 75 is circular in horizontal cross-section and the welded metal wire rings 77 and 78 are circular. The rings 77 and 78 are welded to inclined steel or metal wires 82 which have overlapping U-shaped lower end portions 84, similar to the basket 20 shown in FIG. 3. Two of the diametrically opposed rods 82 have upwardly projecting inverted U-shaped upper end portions 86 which form handles for lifting out the wire basket 75. A porous flexible fabric filter material 90 lines the inner surfaces of the rods 77, 78 and 82 and is formed from a flat sheet of the material by creating tapered pleats 92 within the material. The upper peripheral portion of the filter material 90 is secured to the top ring 77 of the basket 75 by wire clamps or clips 54.

Figure 4:
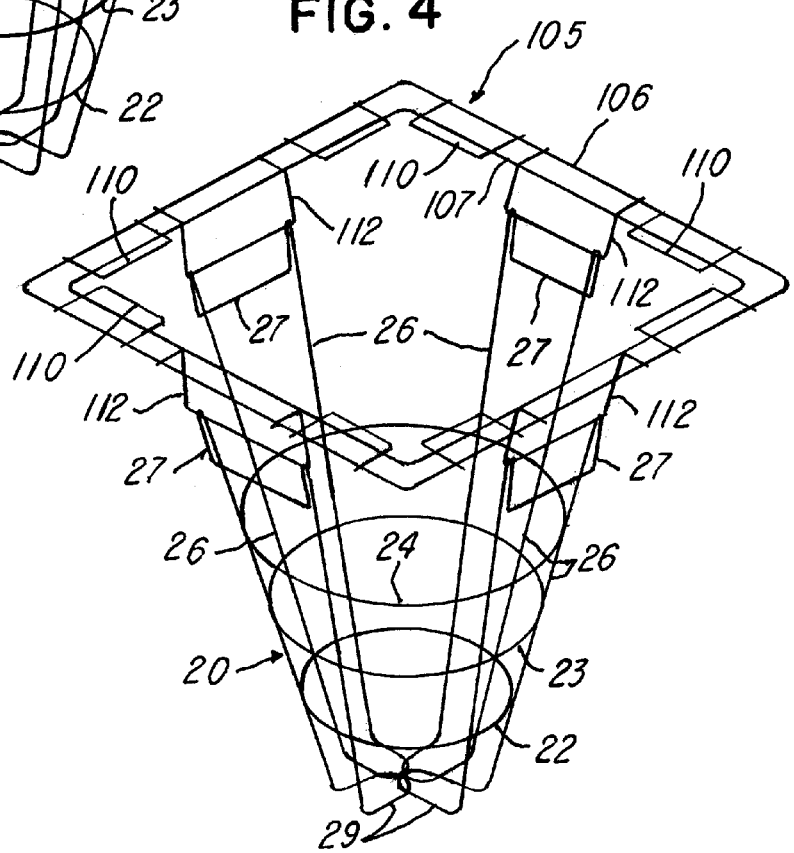
FIG. 4 is a perspective view of the outer wire basket shown in FIG. 3 hooked onto a separate welded wire mount frame in accordance with the invention.

Referring to FIG. 4, a square mount frame 105 is constructed similar to the rectangular mount frame 35 except that the frame 105 has only a square outer frame wire 106 and a coplanar inner square frame wire 107 which are rigidly connected by welded U-shaped cross wires 110 and 112. The inner portions of the wires 112 are bent downwardly and receive the downwardly projecting hook shape end portions 27 of the inclined wires 26 forming the basket 20. The cross wires 110 are used for attaching the filter material which lines the basket 20 with the use of the wire clamps or clips 54. An outwardly projecting flange of the filter material 50, as described above in connection with FIG. 1, overlaps the wire frame 105. Thus the basket 20 with the circular wire rings 22-24 may be used with a square mount frame 105 or by compressing the basket 20 laterally or horizontally into an oval configuration of the rings, the basket 20 may be easily hooked onto a rectangular mount frame such as the mount frame 35, according to the length and the width of the grate supporting frame 65.

Figure 6:
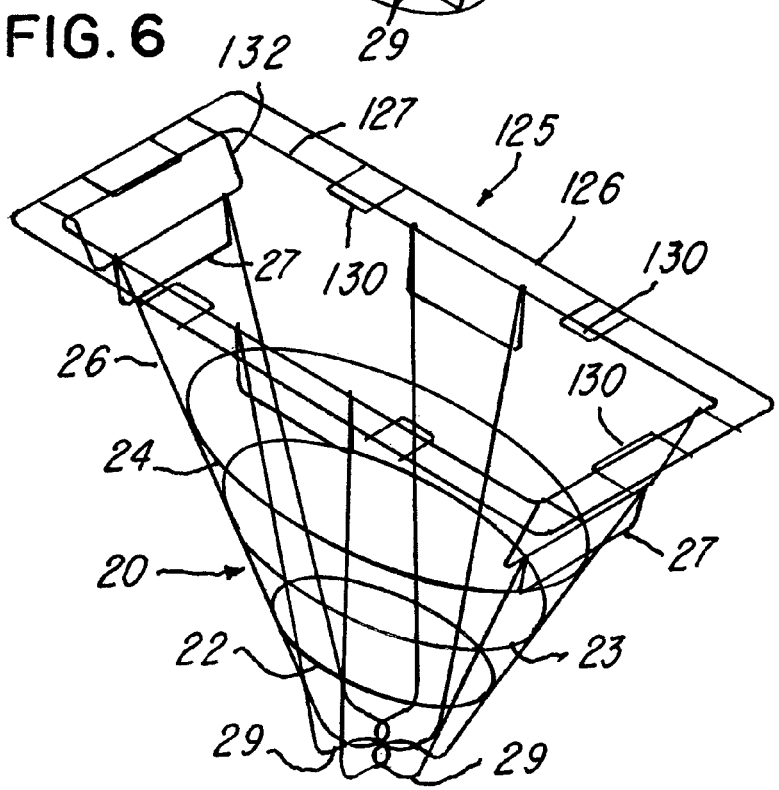

FIG. 6 illustrates an elongated separate mount frame 125 which receives the wire basket 20 after the wire basket 20 is compressed laterally more than the basket 20 shown in FIG. 5 and the basket has a greater oval configuration. In this modification, the wire mount frame 125 has a rectangular outer frame wire 126 and a coplanar and concentric inner rectangular frame wire 127 which are rigidly connected by welded U-shaped cross wires 130 on the sides of the frame and U-shaped cross wires 132 on the opposite ends of the mount frame. In this modification, the folded over end portions 27 of the inclined basket wires 26 are hooked onto the inner frame wire 127 on the sides of the mount frame 125 and hooked onto the downwardly projecting portions of the cross wires 132 at opposite ends of the mount frame 125.

Figure 7:
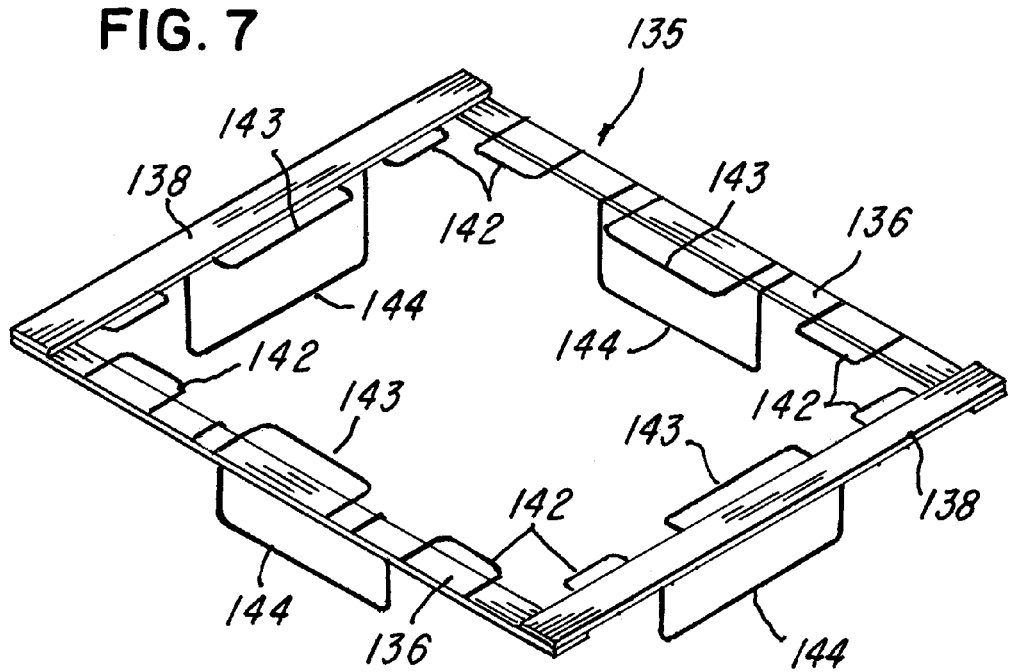
FIG. 7 is a rectangular mount frame constructed in accordance with the invention and having inner wire support members for hooking an outer wire basket as shown in FIG. 3 and in a manner as shown in FIGS. 4-6.

Referring to FIG. 7, a separate mount frame 135 is constructed of flat metal strips 136 and 138 with end portions of the strips 138 overlapping end portions of the strips 136. The overlapping end portions of these strips are welded together, for example, by spot welds, to form the thin flat metal mount frame 135 which seats on the ledge 64 of the grate support frame 65. A set of U-shape cross or frame wires 142 and 143 project inwardly from the straps 136 and 138 with the frame wires 142 and 143 welded to the top surfaces of the straps 136 and welded to the bottom surfaces of the straps 138. This minimizes the thickness of the mount frame 135, thereby minimizing the elevation of the grate 70 above the top edge surface of the grate frame 65. Larger U-shaped cross or frame wires 144 are also welded to the top surfaces of the straps 136 and the bottom surfaces of the straps 138 and have downwardly projecting portions for receiving the hook shape end portions 27 of the inclined wires 26 of the wire basket 20. The frame wires 142 and 143 are used to attach the upper edge portion of the filter material 50 with the wire clips 54 as described above in connection with FIGS. 1 and 2.

From the drawings of the above description, it is apparent that a storm water sewer filter system constructed in accordance with the invention provides the desirable features and advantages mentioned above. That is, a filter system constructed according to the invention is lightweight and durable in construction, easy to install onto a supporting grate frame, convenient to remove collected sediment within either the basket 20 or the lift out basket 75, and convenient to dump collected sediment and other materials from the wire filter baskets 20 and 75 simply by inverting and tapping on the baskets. The wire hook connection of the wire filter basket 20 to the separate mount frames 35,105,125 or 135 also cooperates to minimize the cost of constructing and assembling the filter basket to the mount frames. The hook connection of the wire basket 20 also enables the basket to be used with many types and shapes of mount frames such as the square mount frame 105 or the rectangular mount frames 35, 125 and 135 simply by deforming and laterally compressing the circular basket frame 20 shown in FIG. 3 to an oval configuration that is shown in FIGS. 5 and 6. This feature is very desirable in view of the many hundreds of different sizes and shapes of grate frames in the field and the simple and economical construction of the mount frames 35, 105, 125 and 135.

While the forms of filter system herein described constitute preferred embodiments of the invention, it is to be understood that the invention is not limited to these precise forms, and that changes may be made therein without departing from the scope and spirit of the invention as defined in the appended claims.

What is claimed is:

1. A filter system in combination with a storm water sewer having an inlet defined by openings within a removable grate supported by an internal ledge of a surrounding grate frame, said filter system comprising a horizontal substantially flat mount frame supported by said ledge and including inner support wires around said frame, a fabricated tapered outer wire basket positioned below said mount frame and having crossing wires welded together to form a tapering annular side wall defining openings providing for a flow of storm water received from said openings in said grate through said basket, a porous flexible filter material lining said annular side wall of said outer wire basket and covering said openings within said basket, an upper portion of said outer wire basket including wire hook portions hooked onto said inner support wires of said mount frame and supporting said outer wire basket from said mount frame in suspended relation, said filter material having an upper peripheral portion attached to said upper portion of said outer wire basket and positioned to receive storm water and sediment flowing through said openings within said grate, a fabricated tapered inner wire basket substantially smaller than said outer wire basket and positioned within a lower portion of said outer wire basket, said inner wire basket having crossing wires welded together to form a tapering annular side wall defining openings and including handle members extending within said outer wire basket, a porous flexible filter material lining said annular side wall of said inner wire basket and covering said openings within said inner wire basket, and said inner wire basket being removable from said outer wire basket by lifting said inner wire basket with said handle members and through said grate frame after said grate is removed from said grate frame to provide for conveniently dumping sediment collected within said inner wire basket and for reusing said inner wire basket within said outer wire basket.

2. A filter system as defined in claim 1 wherein said flat mount frame comprises a set of coplanar and concentrically spaced frame wires connected by U-shape cross wires welded to said frame wires.

3. A filter system as defined in claim 2 wherein a plurality of said U-shape cross wires of said mount frame comprise said support portions projecting downwardly from said frame wires, and said wire hook portions of said outer wire basket hook onto said support portions of said cross wires.

4. A filter system as defined in claim 3 wherein said support portions of said cross wires define overflow passages for said outer wire basket.

5. A filter system as defined in claim 4 wherein two opposing said overflow passages define openings under said frame wires to facilitate lifting said mount frame and said outer wire basket upwardly through said grate frame.

6. A filter system as defined in claim 2 wherein said mount frame comprises a set of coplanar and concentrically spaced frame wires including an inner frame wire, an outer frame wire and an intermediate frame wire, and said wire hook portions of said outer wire basket hook onto said inner frame wire.

7. A filter system as defined in claim 1 wherein said mount frame is rectangular and said outer wire basket and said inner wire basket are oval in horizontal cross-section.

8. A filter system as defined in claim 1 wherein said mount frame comprises strips of metal having overlapping end portions, and said inner support wires are welded to said strips and project inwardly from said strips.

9. A filter system as defined in claim 1 wherein said mount frame is rectangular, and said outer wire basket has an oval horizontal cross-sectional configuration.

* * * * *